US009232023B2

(12) United States Patent
Su

(10) Patent No.: US 9,232,023 B2
(45) Date of Patent: Jan. 5, 2016

(54) METHOD FOR PROVIDING INTERNET SERVICES FOR SOCIALIZATION PURPOSES

(71) Applicant: MOREGEEK ENTERTAINMENT INC., Kaohsiung (TW)

(72) Inventor: Yu-Cheng Su, Kaohsiung (TW)

(73) Assignee: Moregeek Entertainment Inc., Kaohsiung (TW)

( * ) Notice: Subject to any disclaimer, the term of this patent is extended or adjusted under 35 U.S.C. 154(b) by 318 days.

(21) Appl. No.: 13/792,672

(22) Filed: Mar. 11, 2013

(65) Prior Publication Data

US 2014/0201261 A1 Jul. 17, 2014

(30) Foreign Application Priority Data

Jan. 14, 2013 (TW) .............................. 102101347 A

(51) Int. Cl.
*G06F 15/16* (2006.01)
*H04L 29/06* (2006.01)
*H04L 29/08* (2006.01)

(52) U.S. Cl.
CPC .............. *H04L 67/38* (2013.01); *H04L 67/306* (2013.01)

(58) Field of Classification Search
None
See application file for complete search history.

(56) References Cited

U.S. PATENT DOCUMENTS

| 2006/0126556 | A1* | 6/2006 | Jiang et al. | 370/328 |
|---|---|---|---|---|
| 2008/0187893 | A1* | 8/2008 | Blaustein et al. | 434/236 |
| 2009/0005140 | A1* | 1/2009 | Rose et al. | 463/7 |
| 2010/0062840 | A1 | 3/2010 | Herrmann | |
| 2011/0035384 | A1* | 2/2011 | Qiu | 707/748 |
| 2011/0230246 | A1 | 9/2011 | Brook et al. | |
| 2013/0059654 | A1* | 3/2013 | Oh | 463/29 |
| 2013/0072308 | A1* | 3/2013 | Peck et al. | 463/42 |
| 2013/0203499 | A1* | 8/2013 | Oh | 463/42 |
| 2014/0155156 | A1* | 6/2014 | Peck et al. | 463/31 |

\* cited by examiner

*Primary Examiner* — Umar Cheema
*Assistant Examiner* — Jean P Mendez Flores
(74) *Attorney, Agent, or Firm* — Alan D. Kamrath; Kamrath IP Lawfirm, P.A.

(57) ABSTRACT

A method for providing interne services for socialization purposes sends an identity data and a location data to a server. The method further converts the identity data and the location data into a profile status data. The method further retrieves a social organization and a character profile of the identity data and determines whether the character profile satisfies a predetermined condition. The identity data is given an authority for predetermined privileged operations or given a right of organization selection. In another embodiment, the identity data is belongs to a social organization having a territory. The method calculates a movement distance based on the location data and the territory, as well as a length of movement time based on the movement distance and a character profile of the identity data. The length of movement time is proportional to the movement distance but is inversely proportional to the character profile.

16 Claims, 2 Drawing Sheets

METHOD FOR PROVIDING INTERNET SERVICES FOR SOCIALIZATION PURPOSES

BACKGROUND OF THE INVENTION

1. Field of the Invention

The present invention generally relates to a method for providing internet services for socialization purposes and, more particularly, to a method for providing internet services for a user to create and run his/her internet social organization for socialization purposes.

2. Description of the Related Art

With the continuous development of communication networks (such as the cable network, the wireless network or the inhomogeneous network), users are able to access the internet via various communication devices (such as computers, smart phones, tablets, etc). The users are able to acquire the required services by searching data online, sending and receiving emails, developing personal social networks, playing online games, etc. Thus, the internet has played an important role in human socialization.

As an example of social networking platforms (such as Facebook), whenever the users travel to a specific place (a restaurant, sightseeing places, etc), they are able to record the place with related messages by using the "check-in" function of said platform. This allows the facebook friends of the users to know where the users have travelled to. However, such social networking platforms do not allow the users and their friends to create an internet social organization based on the places they have travelled to. As such, the social networking platforms do not allow users to have socialization activities based on any location of the world.

As another example of online games, a user and his/her online friends are able to log into a game server to respectively manipulate a virtual character in a game environment of a real-world or virtual-world landmark. These players are able to interact and cooperate with each other in terms of voice and text chats, adventuring, searching for treasures, fighting opponents, etc. during game play. Similar to the social networking platforms, the online games also do not allow users to have socialization activities based on any location of the world. In addition, the players are required to join a certain social organization (such as a game guild or team) before they are allowed to play the game. Since the players are not allowed to create their own social organizations and are not permitted to play the game in the environment of the real-world or virtual-world landmarks based on the created social organizations, users have encountered too many restrictions when playing online games. As such, the users will have less desire to play the games.

To sum up, it is necessary to provide a method for providing internet services for socialization purposes which allows the users to create their own internet social organizations based on a location of the world. The game is able to use any landmark in the world or any virtual landmark as a location to play the game. As such, different users are able to perform interactive operations in the location on the internet, enhancing the socialization skill of the users.

SUMMARY OF THE INVENTION

It is therefore the objective of this invention to provide a method for providing internet services for socialization purposes which allows different users to create their own internet social organizations on any real-world or virtual-world landmark on the internet according to the location data. As such, the users are able to perform interactive or social operations in the internet.

In a preferred embodiment of the invention, a method for providing internet services for socialization purposes comprises sending an identity data and a location data associated with a user to a server, as performed by a respective one of a plurality of client devices. The method further comprises converting the identity data and the location data into a profile status data of a virtual world for display purposes of the respective one of the plurality of client devices, as performed by the server. The method further comprises retrieving a social organization and a character profile of the identity data and determining whether the character profile of the identity data satisfies a predetermined condition, as performed by the server. The identity data is given an authority to create a social organization in the virtual world if the determined result is positive. The identity data is given a right to join a preferred social organization in the virtual world if the determined result is negative.

In a preferred form shown, the character profile of the identity data satisfies the predetermined condition if the character profile is higher than a threshold value.

In the preferred form shown, the authority comprises operations of creating a social organization, selecting a territory of the created social organization, formulating rules of the created social organization, and gathering and directing members of the created social organization.

In the preferred form shown, the territory is of a circular shape having an area of $A=(\text{radius}\times\text{proportion value})^2\times\pi$.

In the preferred form shown, the radius is increased or decreased based on a profile of the created social organization. The proportional value is also increased or decreased based on a profile of the created social organization.

In the preferred form shown, the territory is of a rectangular shape having at least one rectangular grid. Each rectangular grid has a center expressed as a coordinate (X,Y).

In the preferred form shown, the larger the number of the at least one rectangular grid, the higher the profile of the created social organization.

In the preferred form shown, the territory of the created social organization is of a polygonal shape formed by a plurality of vertices.

In the preferred form shown, the location data is a virtual coordinate on a virtual map, a coordinate on an electronic map, or an instant coordinate detected by a global positioning system on the respective one of the plurality of client devices that is portable.

In the preferred form shown, the profile status data comprises a character profile, a belonged organization of the identity data, a belonged territory of the belonged organization, and an environment.

In the preferred form shown, the location data is a location of the respective one of the plurality of client devices in the world. The server calculates a corresponding location of the respective one of the plurality of client devices in a virtual world by multiplying a coordinate of the location by a conversion matrix. The profile status data of the virtual world is generated based on the corresponding location of the virtual world.

In another embodiment of the invention, a method for providing internet services for socialization purposes comprise sending an identity data and a location data associated with a user to a server, as performed by a respective one of a plurality of client devices. The identity data belongs to a social organization having a territory. The method further comprises converting the identity data and the location data into a profile status data of a virtual world for display purposes of the respective one of the plurality of client devices, as performed by the server. The method further comprises calculating a movement distance based on the location data and the territory of the social organization, as well as calculating a length of movement time based on the movement distance and a character profile of the identity data, as performed by the server. This allows an owner of the identity data to perform socialization activities on the territory in the virtual world. The length of movement time is proportional to the movement distance but is inversely proportional to the character profile.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
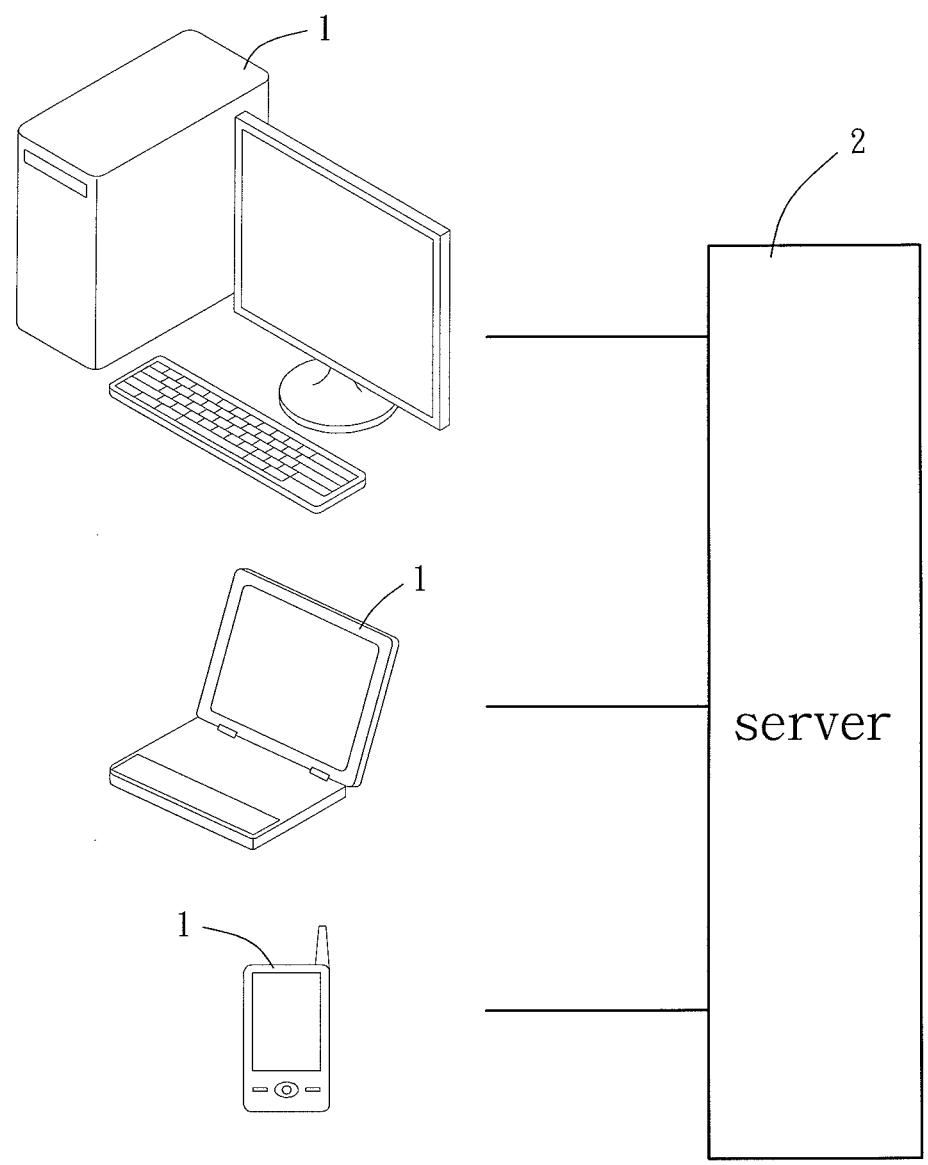
FIG. 1 shows a system in which a method for providing internet services for socialization purposes according to a preferred embodiment of the invention is executed.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

The term "Location Based Service (LBS)" referred to hereinafter is a service that acquires users' locations (geographic coordinates) through a wireless communication network (such as a GSM or CDMA network) based on global positioning technique (such as a GPS system). LBS is a system that provides users with related services based on the use of the geographic information system (GIS). The system can be used in different areas, such as medicine, regular work, daily life, etc. In addition, the system can also be used to detect the location of a person or an object in order to provide localized games, advertisements, navigation services, weather reports or tourist information, etc, as it can be readily appreciated by one having ordinary skill in the art.

The term "social organization" referred hereinafter is an organization created by a user in a virtual world. The organization may be in the form of a union, an association, a team, a troop of people, a small group, etc. The organization may be created via social activities (such as games) or social networking platforms (such as Facebook), but is not limited to what has been described above, as it can be understood by one having ordinary skill in the art.

FIG. 1 shows a system in which a method for providing internet services for socialization purposes according to a preferred embodiment of the invention is executed. The system is comprised of a plurality of client devices 1 and a server 2 coupled to the plurality of client devices 1. Client devices 1 may be the devices that are used with data processing abilities such as desktop computers, notebook computers, tablet computers or smart phones. Each client device 1 is able to execute an application in order for a user (not shown) to input data into client device 1 and to display data on client device 1. As an example, the user is able to log into the application with his/her identity data (such as an account and a password) or location data (such as a coordinate) into client device 1, and to display audio and image data of the application on client device 1 when the user is logged in the application (the images could be from online dating websites or online games). The identity data is used to identify the identification of the user. The location data may be any coordinate or location on a built-in virtual map (usually built in server 2). Alternatively, the location data may be any coordinate or location on a predetermined electronic map, such as a Google map. Alternatively, the location data may also be an instant coordinate or location of the user detected by the GPS of client device 1. However, the types of the location data are not limited to what has been described above.

Server 2 may be established via a conventional network or a cloud network in order to provide internet services such as online social activities. Server 2 is able to receive the identity data and location data from the plurality of client devices 1. Based on this, the identity data and location data from each client device 1 may be converted into a profile status data including audio, image and text data that show the detailed information of a virtual character representative of the user in an online organization, and/or the environment of the character in the online organization. The character's information may include, for example, the character's profile (such as the yanking, experience, property, etc.), the belonged organization of the character, and the belonged territory of the character's organization. In this manner, the profile status data may be converted into audio, image and text data that reflects the current condition of the character in the organization and the character's environment. The information can be displayed on client device 1 for the user to socialize and interact with others on the internet. For example, the user on client device 1 is able to socialize and interact with others through online dating websites or online games, enhancing the skill and ability of the user to socialize with people on the internet. In this embodiment, the method for providing internet services for socialization purposes is illustrated based on the example of online games. However, the proposed method of the invention can also be executed based on other internet platforms.

Figure 2:
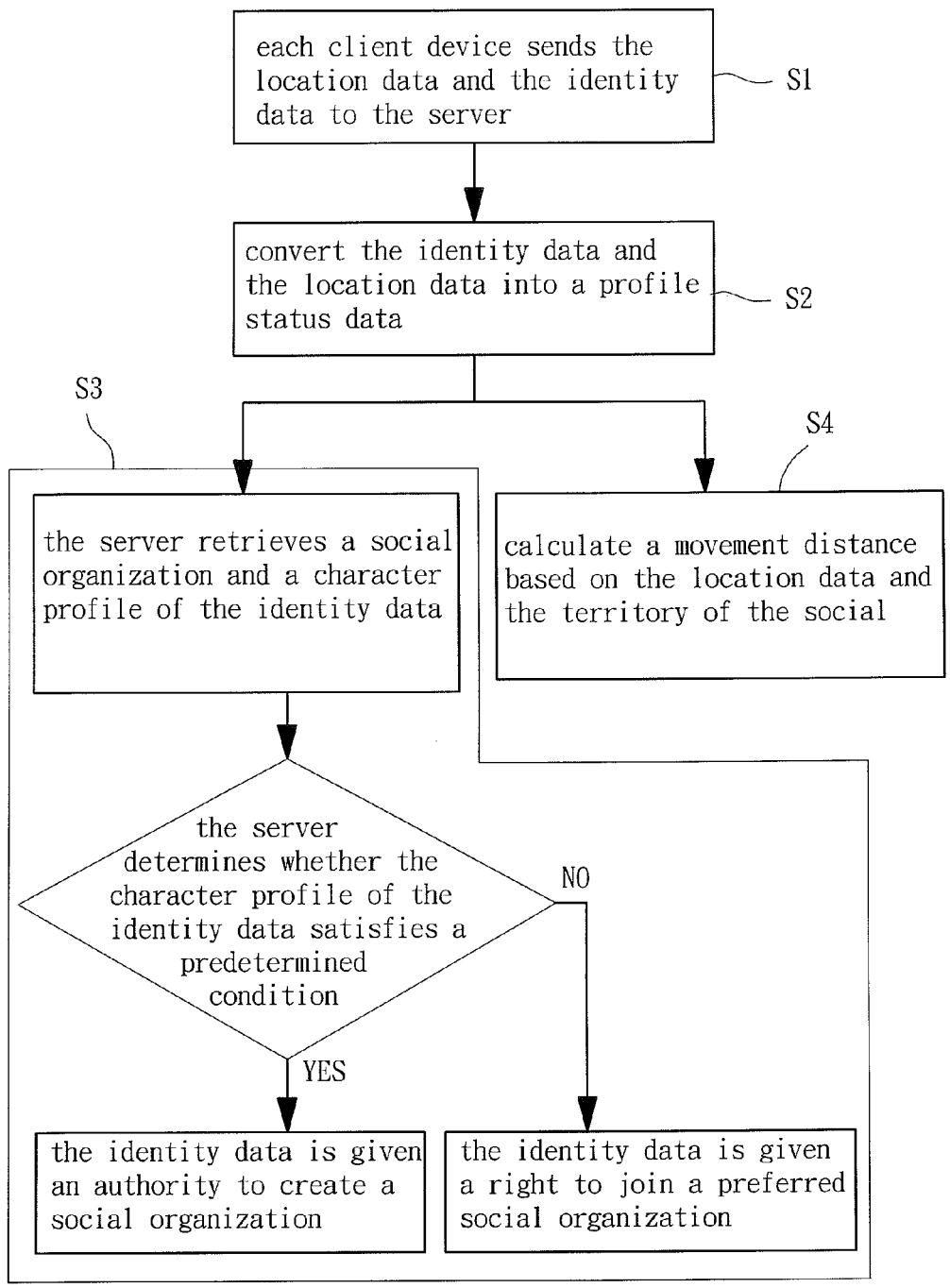
FIG. 2 shows a flowchart of the method for providing internet services for socialization purposes according to the preferred embodiment of the invention.

FIG. 2 shows a flowchart of the method for providing internet services for socialization purposes according to the preferred embodiment of the invention. The method comprises a first step S1, a second step S2, a third step S3 and a fourth step S4.

First step S1 is configured to send the location data and the identity data from the plurality of client devices 1 to server 2 for different users. Specifically, an individual user is able to input his/her personal identity data into client device 1 and to select a location via client device 1. The location may be selected from the virtual map, the electronic map, the GPS, etc. When the location is selected, the location data is determined. Next, client device 1 sends the location data and the identity data to server 2. In this stage, the user is also able to input one or more commands into client device 1 to execute a desired operation or operations, such as establishing a new organization, joining an organization or changing the organization. In other words, the command represents an operation the user intentionally performs.

Second step S2 is configured to convert the identity data and the location data of each client device 1 into a profile status data for display purposes of client device 1. Specifically, server 2 receives the location data and the identity data from individual client device 1 and converts the received data into the profile status data. As stated above, the profile status data includes audio, image and text data that show the detailed information of the character and/or the environment of the character in the online organization. Server 2 may generate the environment of the virtual character based on a default manner. For example, if the location data specifies a certain site in the real world (such as New York), the site is mapped to the virtual world as specified by the profile status data (New York in the real world is mapped to the virtual world as a location in the game). Based on this, the virtual character in the game is able to perform a variety of actions at the location, such as creating an organization, fighting other organizations, doing construction work on the territory, robbing others' territories and so on. As another example of online dating websites, the user may log onto the websites to conduct various activities or exhibitions. Alternatively, the environment of the character may be determined by the designers of the game (such as the design team who designs the games or the online dating websites) using client device 1. For example, if the location data specifies a certain location in the real world (such as New York), the location is mapped to the virtual world as determined by the design team (New York in the real world is mapped to the virtual world as a location to play the game). Alternatively, the environment of the character can also be generated from the virtualization of a certain location in the real world as performed by server 2. However, the generation of the environment is not limited to the above examples. In the default manner mentioned above, the location data is a location of client device 1 in the world (the location may be obtained from the GPS or may be any location on a Google map). Based on this, server 2 calculates a corresponding location of client device 1 in the virtual world by multiplying a coordinate of the location of client device 1 in the world by a conversion matrix. The profile status data of the virtual world is generated based on the corresponding location of client device 1 in the virtual world.

In the following stage, server 2 converts the personal identity data into the character's profile, the belonged organization of the character, and the belonged territory of the character's organization. Specifically, if the user joins a social organization (such as the game guild/team), server 2 sets the account of the user as belonging to the social organization and further saves the social organization and the possessed territory of the character's organization. In another case where the user was already registered at a social organization, server 2 is able to retrieve that social organization from the database and is able to adjust the profile of the character according to the amount of contribution the user has committed to the social organization. Specifically, the ranking, experience and property in the character's profile are adjusted according to the user's contribution to the social organization. Furthermore, server 2 sends the profile status data to client device 1 for display purposes of client device 1. The manner in which client device 1 displays the profile status data is of conventional skill and therefore is not described herein.

In third step S3, server 2 retrieves the profile of the character and determines whether the profile of the character satisfies a predetermined condition. If so, the account of the character is given an authority for certain privileged operations. If not, the account of the character is given a right to only select the preferred social organization the user wants to join. Specifically, server 2 is able to determine the belonged organization and the condition of the profile of the character (ranking, experience, property, etc.). If the profile of the character satisfies the predetermined condition where the ranking, experience or property of the character exceeds a threshold value (for example, the ranking of the account is higher than 80), the account is given the authority to create his/her own social organization (such as a game guild/team), to choose the type of the territory of the created organization (such as a circular shape, a rectangular shape, or a polygonal shape formed by a plurality of vertices), to formulate the rules of the created organization which the incoming members are obligated to follow (such as the manner the members of the organization can involve the affairs of the organization as well as the manner the resources of the organization's territory can be rewarded to the members), and to gather and direct the organization's members for certain affairs (such as for construction work or protecting the organization from the invasion of foreign organizations). To the contrary, if the profile of the character does not satisfy the predetermined condition, the account of the user is given a right to only select the social organization he/she prefers to join. In this scenario, the member should follow the rules of his/her organization.

If the territory is of a circular shape, the area (or size) of the circular territory can be calculated based on the following formula:

$$A=(radius \times proportion\ value)^2 \times \pi,$$

wherein $\pi$ is the ratio of the circumference of a circle to its diameter. The radius or the proportion value can be increased or decreased based on the profile of the social organization (such as the reputation value or the number of total members of the organization) in order to reflect the current status of the organization. If the territory is of a rectangular shape, the territory has at least one rectangular grid whose center can be expressed by the coordinate (X,Y). The higher the profile of the organization, the larger the number of grids of the organization. Thus, the profile of the organization is proportional to the range of the character's territory. When the territories of two adjacent organizations are too close to each other (for example, the distance between the two territories is smaller than the warning value), server 2 is able to send a warning message to all of the members of the two organizations. When the distance between the two territories is infringed upon by the opposing party or the two territories start to overlap, the members on both sides can fight each other. During the conflict of the two organizations, the losing party will lose a part or all of its territory. Fourth step S4 can also be performed during third step S3.

In fourth step S4, server 2 calculates a movement distance of each character based on the current location of the character (as specified by the location data) and the range of the territory of the character's organization, and further calculates a length of movement time of the character based on the calculated movement distance and the profile of the character, in order for the user to decide whether to manipulate the character to perform desired actions. The length of movement time is proportional to the movement distance but is inversely proportional to the level of the character's profile. Specifically, when the members on both sides fight each other, the founders of the organizations are able to recall their members back to their territories for defense purposes or for resource investments. At this time, server 2 calculates the movement distance of the character based on the current location of the character and the range of the territory of the character's organization. The movement distance represents the expected distance of the character traveling back to its own territory. Based on this, server 2 is able to calculate the length of movement time of the character based on the movement distance and at least one item of the character's profile, in order for the user to decide whether to use the character for certain missions. For instance, the user is able to decide whether to dispatch the character back to its territory to fight the other organization based on the length of movement time. Furthermore, if a certain item of the character's profile has a higher value, the character is able to move faster or to invest resources quickly. Thus, the character is able to travel back to its territory in a shorter time.

As an example, assume a defending organization has a territory and members "a1" and "a2" and an offending organization has members "b1" and "b2". In this scenario, when the offending organization attacks the defending organization for its territory, both parties have to dispatch their members (such as gold knights, grand knights, silver knights or copper knights) to the territory for battle. At this time, member "b1" is able to dispatch a gold knight (which has a mobility of 100/h, an attack of 50 and a defense of 20) to the territory, and member "b2" is able to dispatch a grand knight (which has a mobility of 50/h, an attack of 50 and a defense of 20) to the territory. On the other side, member "a1" has already dispatched a silver knight (which has a mobility of 10/h, an attack of 50 and a defense of 40) to the territory for defending purposes, and member "a2" is able to dispatch a copper knight (which has a mobility of 150/h, an attack of 50 and a defense of 40) to the territory to help member "a1" defend the territory. In this example, server 2 will determine whether the offending organization is strong enough to successfully take over the territory based on the amount of resources both sides have spent on the battles as well as the quality of the resources. Alternatively, whether the offending organization successfully takes over the defending organization's territory can also be determined based on how skillful the players on both sides play the game.

In conclusion, the method for providing internet services for socialization purposes is summarized herein. First, the plurality of client devices 1 sends the location data and the identity data of different users to the same server 2. Then, server 2 converts the location data and the identity data of each client device 1 into a profile status data for display purposes of the client device 1. Next, server 2 retrieves the profile of the character and determines whether the profile of the character satisfies a predetermined condition. If the determined result is positive, the account of the character is given an authority for certain privileged operations. If the determined result is negative, the account of the character is given a right to only select the preferred social organization the user wants to join. Based on this, server 2 is able to calculate a movement distance of each character based on the location of the character and the range of the organization's territory, and further calculates a length of movement time of the character based on the movement distance and the profile of the character. The length of movement time is proportional to the movement distance but is inversely proportional to the character's profile. As such, different users are able to socialize with each other on the internet through the social organizations established in different locations of the virtual world, enhancing the skill and ability of the user to socialize with people on the internet.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A method for providing internet services for socialization purposes, comprising:
   sending an identity data and a location data associated with a user to a server, as performed by a respective one of a plurality of client devices;
   converting the identity data and the location data into a profile status data of a virtual world for display purposes of the respective one of the plurality of client devices, as performed by the server; and
   retrieving a social organization and a character profile of the identity data and determining whether the character profile of the identity data satisfies a predetermined condition, as performed by the server, wherein the identity data is given an authority to create a created social organization in the virtual world if the determined result is positive, wherein the identity data is given a right to join another social organization in the virtual world if the determined result is negative, wherein the authority comprises operations of creating the created social organization, selecting a territory of the created social organization, formulating rules of the created social organization, and gathering and directing members of the created social organization, wherein the territory is of a circular shape having an area of $A=(radius \times proportion\ value)^2 \times \pi$, wherein the radius is increased or decreased based on a profile of the created social organization, wherein the profile of the created social organization is a reputation value or a number of the members of the created social organization, and wherein the proportional value is increased or decreased based on the profile of the created social organization.

2. The method for providing internet services for socialization purposes as claimed in claim 1, wherein the character profile of the identity data satisfies the predetermined condition if the character profile is higher than a threshold value.

3. The method for providing internet services for socialization purposes as claimed in claim 1, wherein the territory is of a rectangular shape having at least one rectangular grid, and wherein each rectangular grid has a center expressed as a coordinate (X,Y).

4. The method for providing internet services for socialization purposes as claimed in claim 3, wherein the larger the number of the at least one rectangular grid the higher a profile of the created social organization.

5. The method for providing internet services for socialization purposes as claimed in claim 1, wherein the territory of the created social organization is of a polygonal shape formed by a plurality of vertices.

6. The method for providing internet services for socialization purposes as claimed in claim 1, wherein the location data is a coordinate on a virtual map.

7. The method for providing internet services for socialization purposes as claimed in claim 1, wherein the location data is a coordinate on an electronic map.

8. The method for providing internet services for socialization purposes as claimed in claim 1, wherein the location data is an instant coordinate detected by a global positioning system on the respective one of the plurality of client devices that is portable.

9. The method for providing internet services for socialization purposes as claimed in claim 1, wherein the profile status data comprises a character profile, a belonged organization of the identity data, a belonged territory of the belonged organization, and an environment.

10. The method for providing internet services for socialization purposes as claimed in claim 1, wherein the location data is a location of the respective one of the plurality of client devices in the world, wherein the server calculates a corresponding location of the respective one of the plurality of client devices in a virtual world by multiplying a coordinate of the location by a conversion matrix, and wherein the profile status data of the virtual world is generated based on the corresponding location of the virtual world.

11. A method for providing internet services for socialization purposes, comprising:

sending an identity data and a location data associated with a user to a server, as performed by a respective one of a plurality of client devices, wherein the identity data belongs to a social organization having a territory;

converting the identity data and the location data into a profile status data of a virtual world for display purposes of the respective one of the plurality of client devices, as performed by the server;

retrieving the social organization and the character profile of the identity data and determining whether the character profile of the identity data satisfies a predetermined condition, as performed by the server, wherein the identity data is given an authority to create a created social organization in the virtual world if the determined result is positive, wherein the identity data is given a right to loin another social organization in the virtual world if the determined result is negative, wherein the authority comprises operations of creating the created social organization, selecting a territory of the created social organization, formulating rules of the created social organization, and gathering and directing members of the created social organization; and calculating a movement distance based on the location data and the territory of the social organization, as well as a length of movement time based on the movement distance and a character profile of the identity data, as performed by the server, in order for an owner of the identity data to perform socialization activities on the territory in the virtual world, wherein the length of movement time is proportional to the movement distance but is inversely proportional to the character profile.

12. The method for providing internet services for socialization purposes as claimed in claim 11, wherein the location data is a virtual coordinate on a virtual map.

13. The method for providing internet services for socialization purposes as claimed in claim 11, wherein the location data is a coordinate on an electronic map.

14. The method for providing internet services for socialization purposes as claimed in claim 11, wherein the location data is an instant coordinate detected by a global positioning system on the respective one of the plurality of client devices that is portable.

15. The method for providing internet services for socialization purposes as claimed in claim 11, wherein the profile status data comprises a character profile, a belonged organization of the identity data, a belonged territory of the belonged organization, and an environment.

16. The method for providing internet services for socialization purposes as claimed in claim 11, wherein the location data is a location of the respective one of the plurality of client devices in the world, wherein the server calculates a corresponding location of the respective one of the plurality of client devices in a virtual world by multiplying a coordinate of the location by a conversion matrix, and wherein the profile status data of the virtual world is generated based on the corresponding location of the virtual world.

* * * * *